(12) United States Patent
Rau et al.

(10) Patent No.: US 8,468,071 B2
(45) Date of Patent: Jun. 18, 2013

(54) PROCESSING TRANSACTIONS USING A REGISTER PORTION TO TRACK TRANSACTIONS

(75) Inventors: Scott W. Rau, Pottstown, PA (US); Lee Knackstedt, Bear, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1068 days.

(21) Appl. No.: 11/562,100

(22) Filed: Nov. 21, 2006

(65) Prior Publication Data

US 2007/0094154 A1    Apr. 26, 2007

Related U.S. Application Data

(63) Continuation-in-part of application No. 09/630,595, filed on Aug. 1, 2000.

(60) Provisional application No. 60/774,192, filed on Feb. 17, 2006.

(51) Int. Cl.
*G06Q 40/02* (2012.01)

(52) U.S. Cl.
CPC .................................... *G06Q 40/02* (2013.01)
USPC .......................................................... 705/35

(58) Field of Classification Search
USPC ..................................................... 705/35, 67
See application file for complete search history.

(56) References Cited

U.S. PATENT DOCUMENTS 3,653,480 A   4/1972  Yamamoto et al.
4,205,780 A   6/1980  Burns (Continued)

FOREIGN PATENT DOCUMENTS

EP    421808     4/1991
EP   1014318     6/2000

(Continued)

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.

(Continued)

*Primary Examiner* — Ella Colbert
*Assistant Examiner* — Abdulmajeed Aziz
(74) *Attorney, Agent, or Firm* — Hunton & Williams LLP

(57) ABSTRACT

Systems and methods are provided that keep check of financial transactions by maintaining a count of the financial transactions using a register portion, in conjunction with performing authentication further to inputting transaction data from a data-bearing record that is stored in a device. The system may include a communication portion that inputs transaction data received from the data bearing record, the transaction data including an input transaction count value and an input device differentiator number; and a processing portion that processes the transaction data. The processing portion may include (1) a memory portion that stores stored data; (2) a device identification portion that identifies the device based on the device differentiator number and an account number, the account number being derived from the transaction data; (3) a register portion that maintains a count of financial transactions so as to provide a current transaction count value associated with the input device differentiator number for the account number, the register portion maintaining current transaction count values for respective device differentiator numbers, which device differentiator numbers are associated with the account number; and (4) an authentication portion that performs authentication processing based on a comparison process that utilizes the current transaction count value and the input transaction count value, the authentication portion generating an authentication result, the authentication portion outputting the authentication result.

27 Claims, 8 Drawing Sheets

U.S. PATENT DOCUMENTS

| | | |
|---|---|---|
| 4,264,808 A | 4/1981 | Owens et al. |
| 4,321,672 A | 3/1982 | Braun et al. |
| 4,396,985 A | 8/1983 | Ohara |
| 4,495,018 A | 1/1985 | Vohrer |
| 4,617,457 A | 10/1986 | Myers |
| 4,672,377 A | 6/1987 | Murphy |
| 4,700,055 A | 10/1987 | Kashkashian, Jr. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,317,636 A * | 5/1994 | Vizcaino .................. 705/65 |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,883,810 A | 3/1999 | Franklin et al. |
| 5,884,288 A | 3/1999 | Chang |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,510 A * | 8/1999 | Curry et al. .................. 705/65 |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,953,710 A * | 9/1999 | Fleming .................. 705/38 |
| 5,956,700 A | 9/1999 | Landry |
| 5,963,659 A | 10/1999 | Cahill et al. |
| 5,963,925 A | 10/1999 | Kolling et al. |

| | | |
|---|---|---|
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,032,257 A * | 2/2000 | Olarig et al. .............. 726/35 |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,039,249 A * | 3/2000 | Szewczykowski .......... 235/379 |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,704,714 B1 | 3/2004 | O'Leary et al. |
| 6,721,715 B2 | 4/2004 | Nemzow |
| 6,825,940 B1 | 11/2004 | Wu et al. |
| 6,954,896 B1 | 10/2005 | Dodrill et al. |
| 6,970,259 B1 | 11/2005 | Lunt et al. |
| 7,062,456 B1 | 6/2006 | Riehl et al. |
| 7,104,443 B1 | 9/2006 | Paul et al. |
| 7,177,836 B1 | 2/2007 | German et al. |
| 2001/0018739 A1 | 8/2001 | Anderson et al. |
| 2001/0032139 A1 | 10/2001 | Debonnett, Jr. |
| 2001/0037309 A1 | 11/2001 | Vrain |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0174016 A1* | 11/2002 | Cuervo ................ 705/16 |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0198848 A1* | 12/2002 | Michener ................ 705/75 |
| 2002/0199182 A1 | 12/2002 | Whitehead |
| 2003/0018557 A1 | 1/2003 | Gilbert et al. |
| 2003/0028481 A1* | 2/2003 | Flitcroft et al. ............. 705/39 |
| 2003/0037002 A1 | 2/2003 | Higgins et al. |
| 2003/0046218 A1 | 3/2003 | Albanese et al. |
| 2003/0097335 A1 | 5/2003 | Moskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0172039 A1* | 9/2003 | Guy et al. ................ 705/68 |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0201735 A1 | 10/2004 | Baron |
| 2004/0228514 A1 | 11/2004 | Houle et al. |
| 2004/0254837 A1* | 12/2004 | Roshkoff ................ 705/14 |

| | | | |
|---|---|---|---|
| 2005/0033690 | A1 | 2/2005 | Antognini et al. |
| 2005/0177480 | A1 | 8/2005 | Huang |
| 2005/0199709 | A1* | 9/2005 | Linlor .......................... 235/380 |

FOREIGN PATENT DOCUMENTS

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Blockbuster running test of a stored value card, The American Banker, Sep. 1, 1995.
CES/NaBANCO introduces stored value card technology blockbuster video is first merchant partner, Business Wire, Inc., Jan. 15, 1996.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol. 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.

* cited by examiner

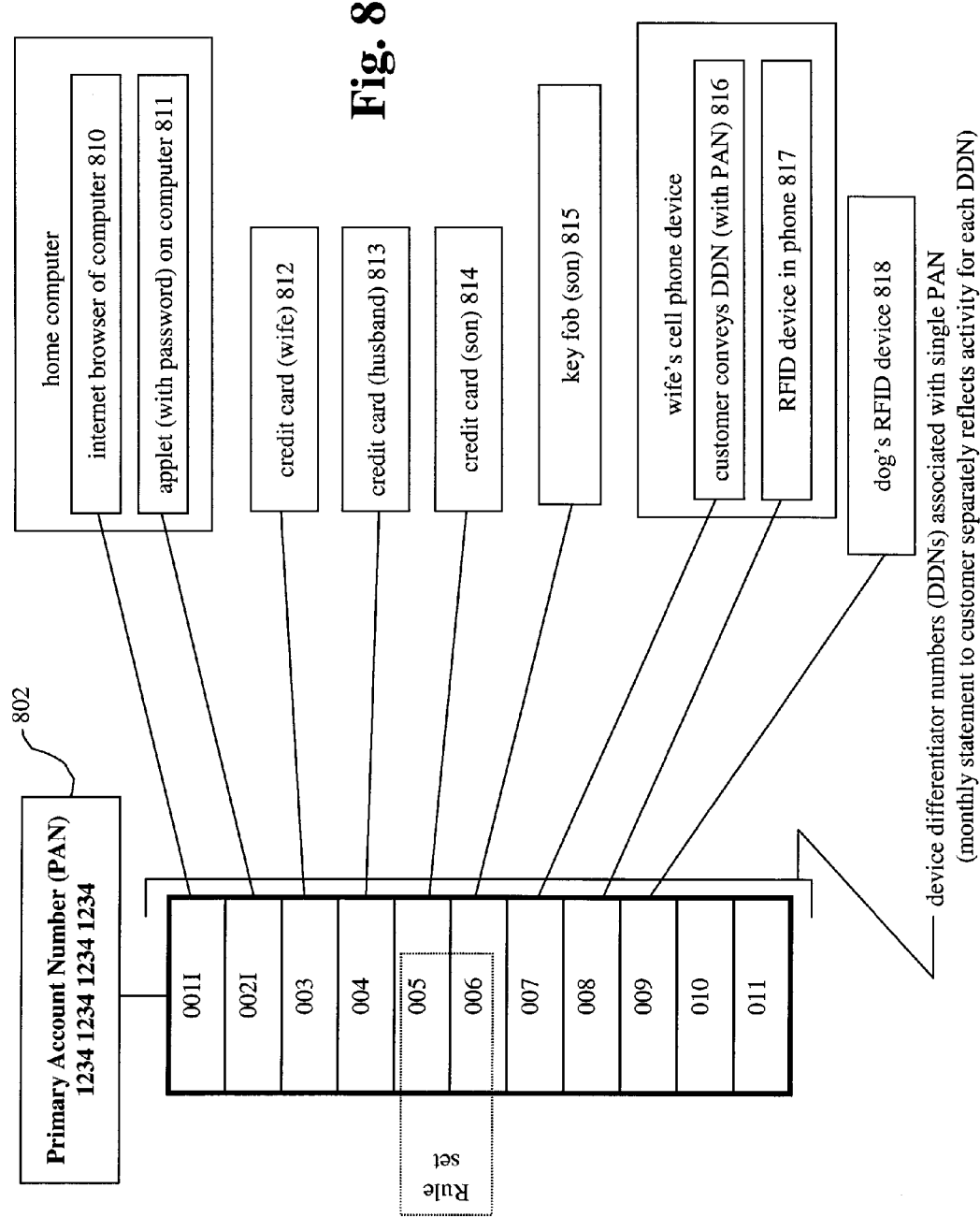

PROCESSING TRANSACTIONS USING A REGISTER PORTION TO TRACK TRANSACTIONS

RELATED APPLICATIONS

This application is a Continuation-in-Part application of U.S. application Ser. No. 09/630,595 filed Aug. 1, 2000, which is incorporated herein by reference in its entirety.

This application also claims priority to provisional U.S. application Ser. No. 60/774,192 filed Feb. 17, 2006, which is incorporated herein by reference in its entirety.

FIELD OF THE INVENTION

The systems and methods of the invention relate to keeping check of financial transactions using a register portion, in conjunction with performing authentication of the transaction.

BACKGROUND OF THE INVENTION

Standard credit cards and other transaction accounts have a Primary Account Number (PAN) which is typically the 16 digit number on the card. In the case of accounts having multiple cards, (e.g., a credit card having PAN xxxx xxxx xxxx xxxx with husband and wife each having a card), each of the multiple cards is the same. However, authentication processing may be complicated by both a husband and wife (or any other multiplicity of persons) using multiple cards off one PAN.

The invention addresses the above problem, as well as other problems, that exist in known technology.

SUMMARY OF THE INVENTION

Systems and methods are provided that keep check of financial transactions by maintaining a count of the financial transactions using a register portion, in conjunction with performing authentication further to inputting transaction data from a data-bearing record that is stored in a device. The system may include a communication portion that inputs transaction data received from the data bearing record, the transaction data including an input transaction count value and an input device differentiator number; and a processing portion that processes the transaction data. The processing portion may include (1) a memory portion that stores stored data; (2) a device identification portion that identifies the device based on the device differentiator number and an account number, the account number being derived from the transaction data; (3) a register portion that maintains a count of financial transactions so as to provide a current transaction count value associated with the input device differentiator number for the account number, the register portion maintaining current transaction count values for respective device differentiator numbers, which device differentiator numbers are associated with the account number; and (4) an authentication portion that performs authentication processing based on a comparison process that utilizes the current transaction count value and the input transaction count value, the authentication portion generating an authentication result, the authentication portion outputting the authentication result.

BRIEF DESCRIPTION OF THE DRAWINGS

The invention can be more fully understood by reading the following detailed description together with the accompanying drawings, in which like reference indicators are used to designate like elements, and in which:

FIG. 8 is diagram showing use of multiple device differentiator numbers with one PAN in accordance with one embodiment of the invention.

DETAILED DESCRIPTION OF PREFERRED EMBODIMENTS

Figure 1:
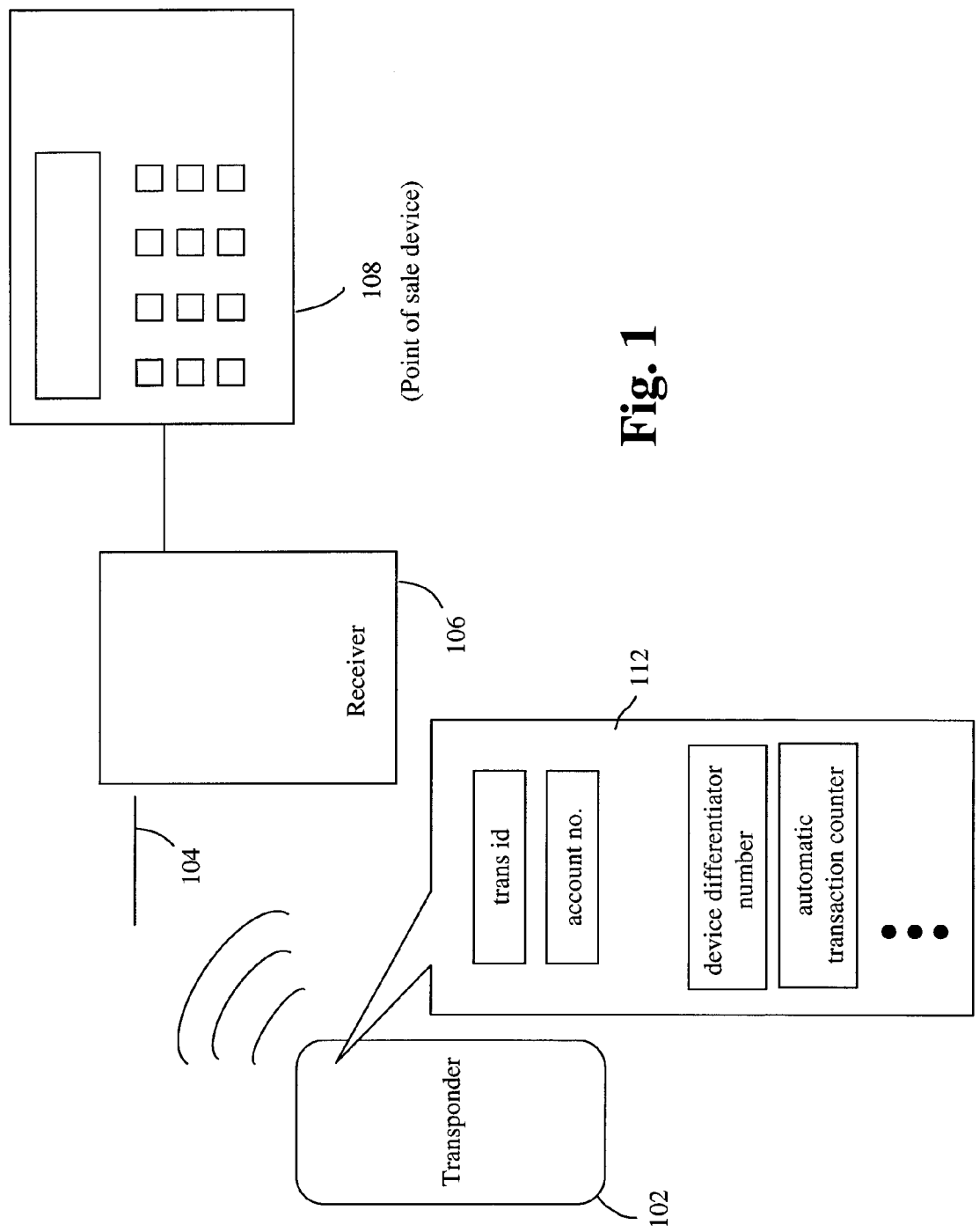
FIG. 1 illustrates an overall transaction architecture according to one embodiment of the invention.

Hereinafter, aspects of methods and systems in accordance with various embodiments of the invention will be described. As used herein, any term in the singular may be interpreted to be in the plural, and alternatively, any term in the plural may be interpreted to be in the singular.

Features of various embodiments of the invention are described herein. The invention relates to utilization of a payment device in a transaction processing system. The payment device may be any of a variety of devices. The invention relates to identification of the particular payment device used in a transaction and processing associated with such identification. For example, the payment device may be a credit card, a smart card, RFID card, other funds card, a special device for effecting internet purchases, a program operating on a computer system, a key FOB, a device with a bar code, a phone, a device in a keychain, a processing component in an personal music device and/or any other payment device that is used by a user to effect a transaction. For example, the payment device may be a software applet running on the user's computer, which allows access to the user's account. Further, the particular payment device may utilize a variety of technologies to interface with other portions of the transaction processing system. Such interface used by the payment device may include magnetic stripe technology, wireless technology and/ or a computer network, for example. For example, as described below in accordance with one embodiment, the invention might utilize RF or RFID technology as an interface between the payment device and the other transaction processing system components. Accordingly, various embodiments of the invention may utilize a variety of systems with differing architecture.

Accordingly, the invention is directed to providing differentiation between such multiple payment devices in the field. In short, any device might be utilized to function as a payment device so long as such device provides information needed to process a transaction, or so long as a customer can transmit the information using the device. However, it is appreciated that the architecture of the transaction processing system, including the payment devices, should preferably be sustained on a global network, i.e., to support global capabilities.

In accordance with one embodiment of the invention, hereinafter features of the invention relating to credit card processing will be described. In running a transaction for a credit card, for example, the card reader typically reads (1) the PAN, (2) expiration date of the card, and (3) discretionary data, for example. All of such information may be read using any suitable reader. The discretionary data may include an ATC (Automatic Transaction Counter) which increments for each new transaction. When the cardholder runs a new transaction, the ATC is read and then compared to an ATC value, when an ATC value is maintained by the authentication platform of the card processor, i.e., when a counter is maintained. If respective derived values, i.e., values derived from the ATC values, do not match, then the transaction is denied. This processing prevents fraud by a person who somehow reads (or otherwise acquires) the PAN and expiration data. Accordingly, the person attempting the transaction needs the ATC counter to run a transaction.

A problem in the "multiple cards per PAN" scenario is that each card will have a different ATC (Automatic Transaction Counter) count. For example, the husband may have an ATC value of 10 transactions on his card, and the wife has an ATC value of 25 transactions on her card. Both cards are tied to the same PAN account. If the card processor has an ATC value of 25 (the wife's value) for the shared PAN, and the husband uses his card which has an ATC of 10, obviously the husband's transaction will not go through. The problem is how does the processor in the authentication platform distinguish between the different cards for the PAN? One solution is to issue a different PAN for each payment device that is issued, e.g. one PAN for each credit card. However, this approach would result in an excessive and effectively unmanageable number of PANs. Also, such an arrangement would not allow a user to have multiple payment devices associated with a single PAN, which is often desired. Accordingly, the one PAN for each payment device is not a workable solution.

In accordance with embodiments of the invention, the solution is to give each separate card (or other payment device) its own unique number or some other indicia. Such unique number might be characterized as a Card Sequence Number (CSN) or a Device Differentiator Number (DDN), for example. As used herein, such number (or other indicia) will be referred to as a "Device Differentiator Number (DDN)".

For example, let's assume the account (PAN) has 4 purchase devices: (1) a first credit card, (2) a second credit card, (3) a first RFID key fob, and (4) a second RFID key fob. Each of the 4 devices is given its own DDN. Each then maintains its own ATC count, and the card processor also maintains an ATC count for each separate DDN. The card processor can not only keep track of which ATC count each device is on, but can also glean substantial information by telling which particular payment device was used to effect which particular transaction.

It is appreciated that while various embodiments of the invention set forth herein include an ATC (Automatic Transaction Counter), e.g., the DDN is used in conjunction with the ATC, such is not needed. Thus, in practice of embodiments of the invention, it is not needed that a particular device utilize, or have, an ATC. For example, in embodiments, a particular device may not use an ATC, but only the DDN as described herein. Thus, the processing of the DDN may or may not be performed in conjunction with (or alongside) the processing of an ATC. As should be appreciated, the utilization of the DDN alone, i.e., without an ATC, lends itself to a wide variety of benefits.

FIG. 1 shows one architecture, in accordance with an embodiment of the invention. FIG. 1 illustrates an overall point of sale architecture that includes a transponder 102 which communicates via an RF link 104 to a receiver 106. The transponder 102 may be or include any of several known electromagnetically coupled devices, generally activated by proximity to an RF-enabled receiving unit, such as receiver 106. Transponder 102 may, for instance, contain an electromagnetic coil antenna for inductive coupling to receiver 106, thereby being energized with small but sufficient electric current to activate embedded electronics within the transponder 102. Those electronics may include memory such as CMOS memory, logic gates, filters for isolating discrete transmission frequencies and other elements known in the art. In one embodiment, transponder 102 may be programmable and able to receive updated programmable instructions via RF link 104, as well as to have electronic memory erased or updated during transactions. Receiver 106 may include an electromagnetic antenna to couple with transponder 102, generally within the range of a few feet of the device.

In the embodiment illustrated in FIG. 1, the receiver 106 is connected to a point of sale (POS) device 108 for conducting a commercial or other transaction. For instance, the point of sale device 108 may be or include any of several commercially known electronic cash registers or related transaction processing equipment, such as point of sale terminals manufactured by Sharp Corp. or others. In one embodiment of the invention, transponder 102 may be embedded within a personal article for convenience, aesthetic and affinity purposes. In that regard, the invention might be integrated in one implementation within a fully functional watch. Embedding in other personal articles, such as key chains, pagers, clothing or other items is also possible. In the operation of the invention, a user who has subscribed to the account system of the invention may approach the receiver 106 at the point of sale device 108 to initiate and complete a purchase or other transaction, such as at a restaurant or grocery market checkout line, or other points of sale. In the embodiment illustrated in FIG. 1, transponder 102 contains an encoded transponder ID 110, which may for instance be a 5-digit number or other identifying information. In this embodiment, transponder 102 may also store an account table 112 directly recording account information for the subscribed user of the transponder 102. The account table 112 may be or include, for example, an account number and other information for a debit account, a cash account, a credit card account, special premises account for internal use such as by employees, or other account information associated with users of the system. The account information in the account table may also include a device differentiator number and an automatic transaction counter (ATC) value.

In the implementation of this embodiment of the invention, receiver 106 is configured to receive the account table 112 and apply an amount being executed at the point of sale device 108 to the account reflected within the account table 112. For instance, a patron who has subscribed to an account according to the system of the invention may approach receiver 106 in a restaurant line and wave a watch or other article containing transponder 102 in proximity of the receiver 106. When transponder 102 comes within range of receiver 106, transponder 102 may be inductively coupled to the coils of an electromagnetic antenna within receiver 106 inducing electrical energy within transponder 102, to establish the RF link 104 with the receiver 106. Upon activation of transponder 102 and radiation of transponder ID 110 to the receiver 106, the receiver 106 may respond with an acknowledge signal to the transponder 102. The point of sale device 108 may indicate on a display screen or otherwise that a transaction is ready to be commenced. Once the point of sale device 108 generates total amount due for the transaction, the receiver 106 may interrogate transponder 102 to obtain account table information from account table 112 for application to the sale.

For instance, if a patron has purchased a meal in a restaurant line at point of sale device 108, the total purchase price may be validated for completion of the transaction. Conversely, if the amount of the transaction cannot be validated, the point of sale device 108 may indicate "cash required" or another message that transponder validation or authorization has failed. If the transaction amount is validated, receiver 106 enters the transaction amount and transmits the revised account table 112 information over the RF link 104 to the transponder 102. A transaction completion signal may be emitted by receiver 106, which in one embodiment may turn off or decouple the transponder 102 via RF link 104.

Figure 3:
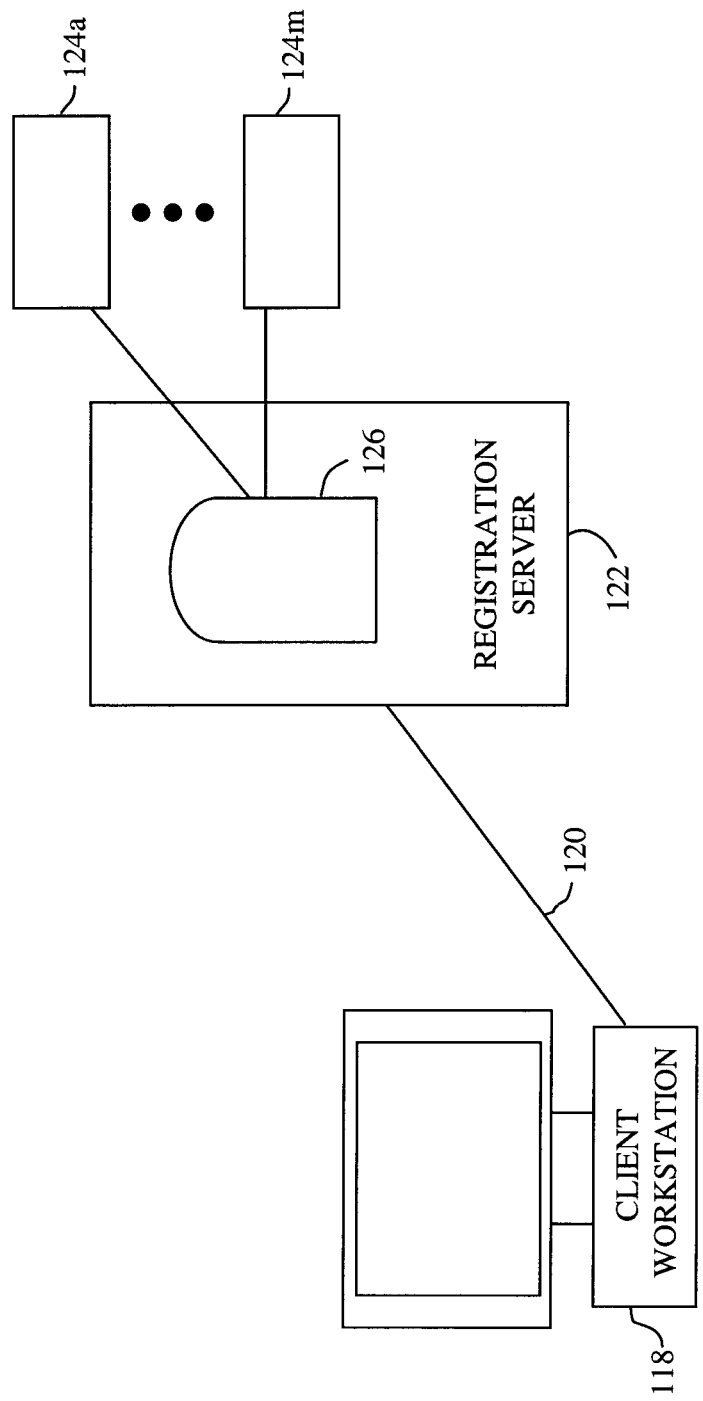
FIG. 3 illustrates an activation architecture for the initiation of user accounts according to the invention.

In terms of new accounts registration as illustrated in FIG. 3, in the invention a network-based activation architecture may be advantageously employed. As shown in the figure, a new user may access a client work station 118 connected via communications link 120 to a registration server 122. The communications link 120 may be, include or access any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections. Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 1802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

The registration server 122 may be or include, for instance, a workstation running the Microsoft Windows™ NT™, Windows™ 2000, Unix, Linux, Xenix, IBM AIX, Hewlett-Packard UX, Novell Netware™, sun Microsystems Solaris™, OS/2™, BeOS™, Mach, Apache, OpenStep™ or other operating system or platform.

The registration server 122 may communicate with client workstation 118 to receive preassigned information related to transponder 102, such as transponder ID 110 which may be printed by sticker on a watch or other article housing the device, for entry into a database 126 within registration server 122 and the setting up of an account. The account may illustratively include or be more than one type of account 124a ... 124n, such as cash accounts, debit accounts, credit card accounts, special purpose vending accounts, telephone card accounts, or others. The registration server 122 may validate the transponder ID 110, and interrogate a new subscriber at client work station 118 to identify or select which one or more of accounts 124a ... 124n the user wishes to associate with the transponder 102.

For instance, the registration 122 may accept a preexisting credit card number for registration with the transponder 102 and execution of future transactions. Once new account information is established, the registration server 122 may communicate via network connection to receiver 106 to update subscriber registration tables within the database 126, receiver 106, point of sale device 108 or other associated hardware to authorize transactions at the point of sale. The paperwork, delay, possibility for error and other drawbacks of paper-based back end account registration is thereby avoided.

Figure 2:
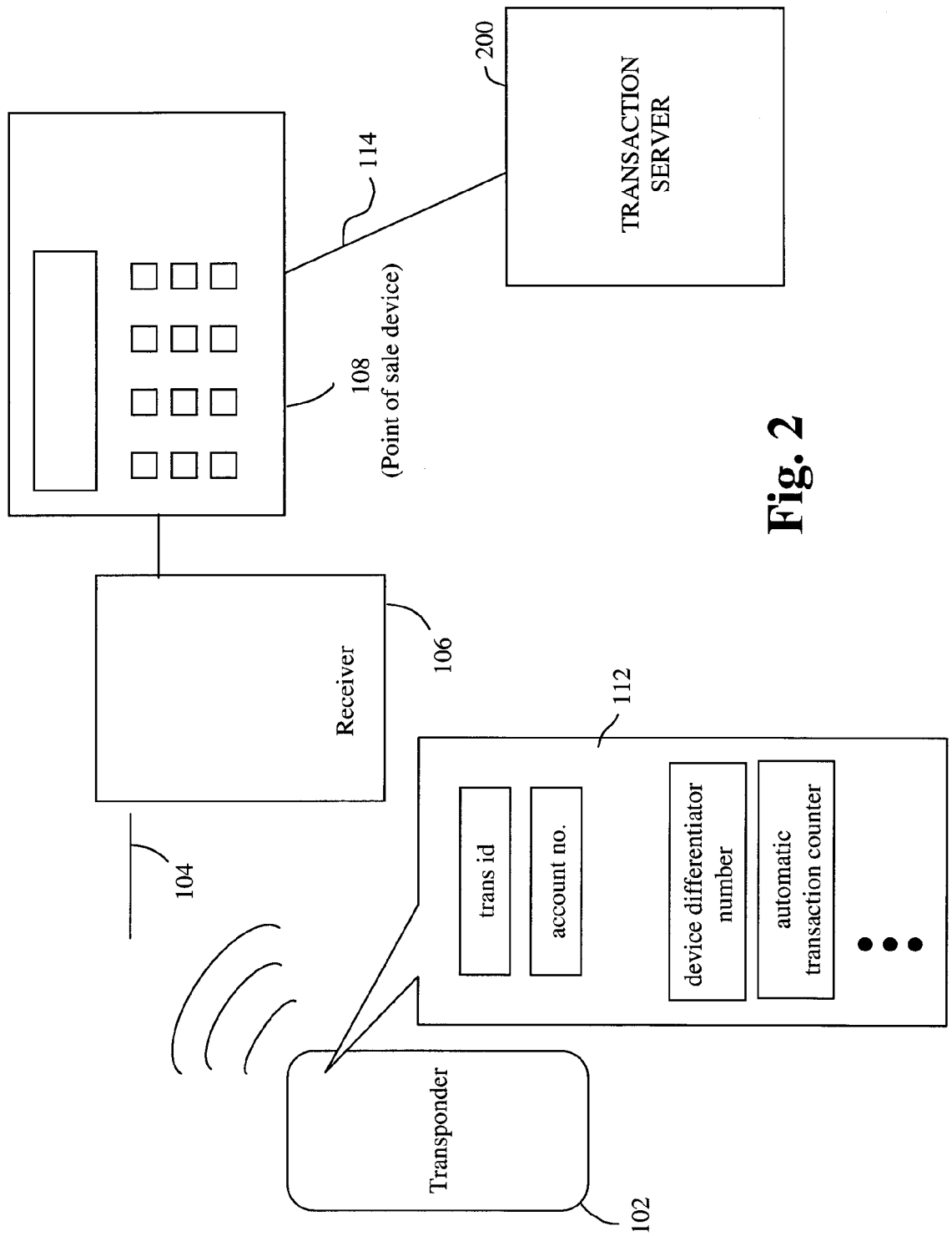
FIG. 2 illustrates an overall architecture of the invention according to a second embodiment of the invention.

A second illustrative embodiment of the invention is shown in FIG. 2, generally involving a processing architecture similar to that of FIG. 1. In this embodiment, a transponder 102 again communicates via RF link 104 with receiver 106 to effectuate point of sale or other transactions. However, in the embodiment of FIG. 2 a portion or all of account table 112 or other information stored in transponder 102 in the first embodiment may be offloaded to economize on the necessary electronics, power consumption and other properties of transponder 102. In the embodiment illustrated in FIG. 2, the point of sale device 108 is additionally connected to a transaction server 200 via communications link 114, for the purpose of authorizing in whole or in part transactions presented for payment using transponder 102. Communications link 114 may be, include or access communications resources similar to communications link 120.

In this embodiment, part or all of the information of account table 112 may be stored in hard disk or other storage 230 of transaction server 200. Transaction initiation begins in the same manner as the embodiment illustrated in FIG. 1, however, after acknowledgments are exchanged between point of sale device 108 and transponder 102 and a transaction is set up, the point of sale device 108 may communicate with transaction server 200 to validate a transaction amount or other information against account information stored in the transaction server 200.

While this implementation involves additional hardware and communications link 114, if transaction server 200 is co-located with the point of sale device 108, such as in a restaurant or retail outlet, communication delays may be minimal. Furthermore if the transaction server 200 is dedicated to processing transactions only at the site of point of sale device 108 or closely grouped facilities, processing burdens may be comparatively modest. In another embodiment of the invention, transaction server 200 may communicate with remote credit file databases or other information resources before authorizing or completing a transaction initiated over RF link 104 at receiver 106, when circumstances may permit some execution delay to be acceptable.

Alternatively, in another embodiment of the invention the point of sale device 108 may perform a preliminary authorization for transactions presented at the receiver 106, to collect and temporarily store transactions, for instance over 2 or 3 hour periods, for batch processing remotely via transaction server 200. Since the majority of transactions typically reconcile without difficulty, this implementation permits more-immediate completion while still checking on account validations at frequent intervals.

Figure 4:
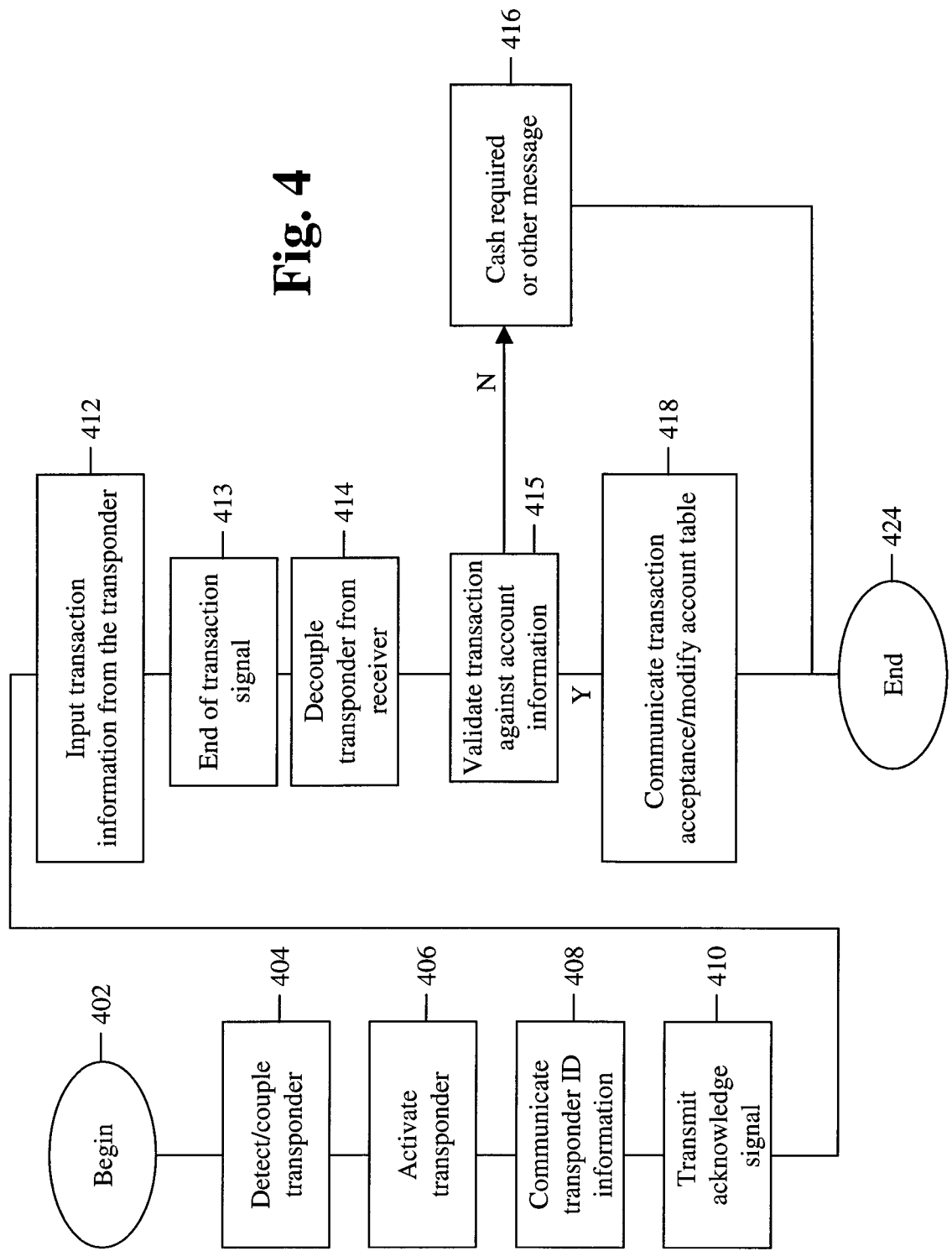
FIG. 4 illustrates a flowchart of transaction processing according to the invention.

Overall transaction processing is illustrated in the flowchart of FIG. 4. In step 402, processing begins. In step 404, the receiver 106 is presented with transponder 102 within range of electromagnetic coupling, such as inductive coupling. In step 406, transponder 102 is activated, for instance by inductive energization of its circuitry. In step 408 transponder 102 may communicate transponder ID 110, which the receiver 106 acknowledges with an acknowledge signal over RF link 104 in step 410.

In step 412, transaction information is input from the transponder. After step 412, the process passes to step 413.

In step 413, an end of transaction signal is sent to transponder 102. Then, in step 414, transponder 102 decouples from the receiver 106.

In step 415, transaction table 112 or other account information may be interrogated to determine whether account parameters permit the pending transaction at the point of sale device 108, i.e., a validation process is performed on the transaction. If the transaction is not validated, then in step 416 a "cash required" or other message is signaled at point of sale device 108, and processing proceeds to step 424 whole processing ends.

If the account to be applied to the pending transaction is validated at step 414, in step 418, the point of sale device 108 and receiver 106 communicate with transponder 102 to indicate transaction acceptance, and modify information within account table 112 if appropriate. In step 424, processing ends.

The foregoing description of the system and method for transponder-activated transactions is illustrative, and variations in configuration and implementation will occur to persons skilled in the art. For instance, while transponder 102 has been described as electromagnetically coupling with the receiver 106, or other types of detection and coupling could be used. For instance, an infrared device, a biometrically enabled or other device may be presented to corresponding detecting apparatus at the point of sale. Similarly, transponder 102 may contain or store other types or forms of information other than transponder ID 110 and account table 112.

In general, in implementation of the various embodiments of the invention, any type of arrangement may be used to transmit information from the payment device to an transaction processing system. For example, an RF or RFID interface may be used as described herein, as well as any other suitable wireless interface might be used. Other interface arrangements that might be used to communicate information between the payment device and the transaction processing system include a bar code reader, a magnetic stripe reader, a hologram reader, any other visual identifier and associated reader, a key entry device, the Internet or any other computer network, any point of sale (POS) device and/or a phone network or any other communication network or arrangement, for example.

Hereinafter, further details of the architecture and processing of the transaction server 200 will be described in accordance with embodiments of the invention. In particular, aspects of processing by the transaction server 200 relating to the device differentiator number (DDN) will be described. For example, each transponder 102 may be associated with a particular device differentiator number.

Figure 6:
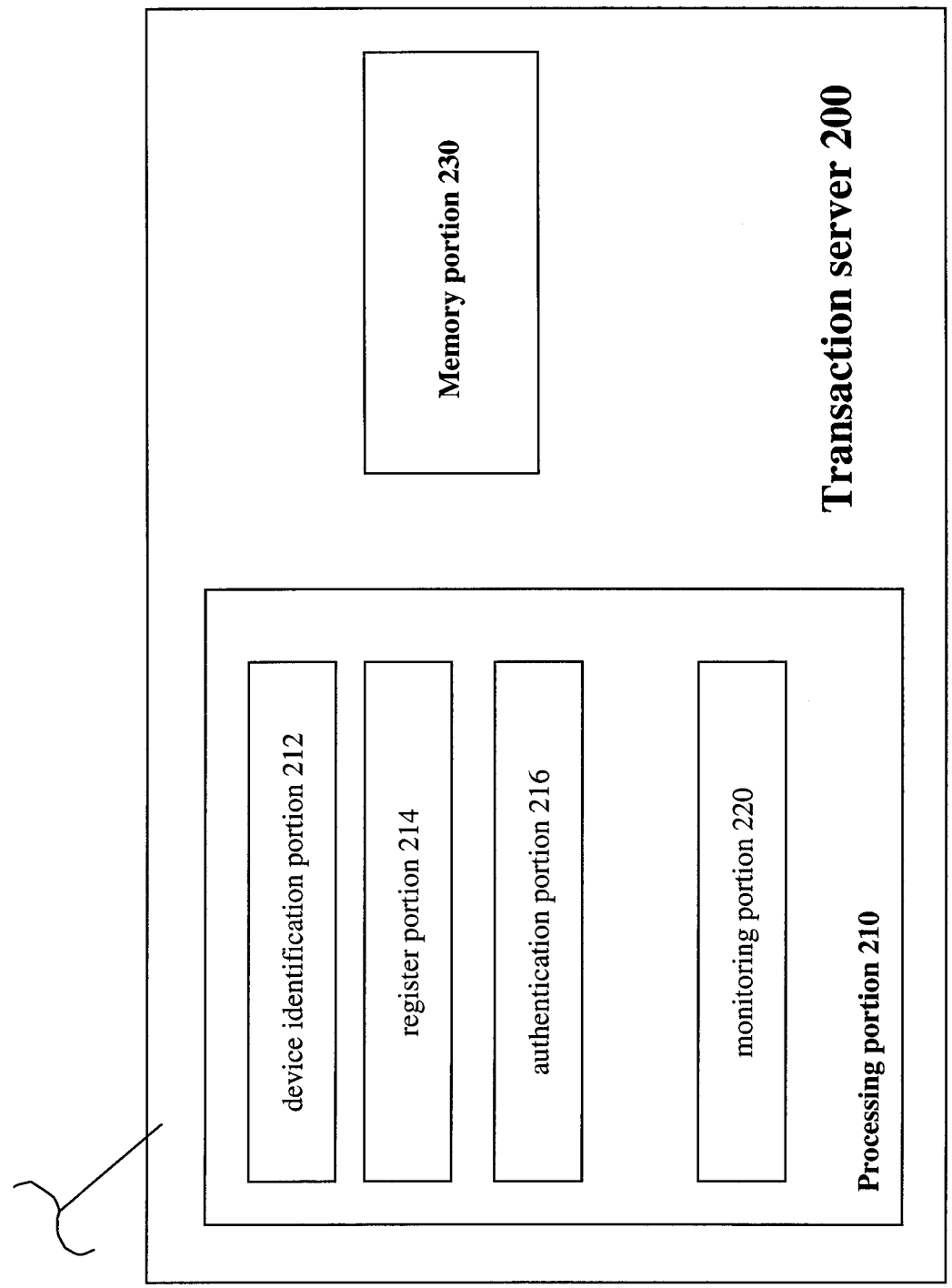
FIG. 6 is block diagram showing further details of the transaction server 200 in accordance with one embodiment of the invention.

As described herein, the transaction server 200 performs authorization processing for transactions presented for payment using transponder 102. This authorization is performed at the transaction server 200. FIG. 6 is a block diagram showing further details of the transaction server 200 in accordance with one embodiment of the invention.

As shown in FIG. 6, the transaction server 200 includes a processing portion 210. The processing portion 210 performs a variety of processing in the transaction server 200. For example, such processing is related to authorization of a requested transaction and/or monitoring of transactions, for example. The transaction server 200 further includes a memory portion 230. The memory portion 230 may be in the form of a computer readable medium. The memory portion 230 stores a wide variety of data needed in operation of the transaction server 200. Such data may relate to accounts of customers, aggregated data and/or behavior information, for example.

The processing portion 210 includes a number of processing components. Specifically, the processing portion 210 includes a device identification portion 212, a register portion 214 and an authentication portion 216, as well as a monitoring portion 220.

The various processing performed by the components in the processing portion 210 are discussed further below. However, in summary, the device identification portion 212 identifies the device that is associated with a particular requested transaction. The register portion register portion 214 in turn identifies the transaction count value for the particular requested transaction. The authentication portion 216 works in conjunction with the device identification portion 212 and the authentication portion 216 to effect the authentication of the requested transaction. The processing portion 210 also includes the monitoring portion 220. The monitoring portion 220 analyzes data acquired (from the various transactions that are processed by the transaction server 200) for a variety of purposes. For example, the monitoring portion 220 analyzes the data to identify behavior and to prevent fraud.

Hereinafter, further aspects of the invention will be described relating to the use of device differentiator numbers and transaction count values, as well as the associated processing of the transaction server.

Transactions processed by the system of FIG. 1 are typically associated with a transaction account. As described herein, transaction accounts have a Primary Account Number (PAN) which is typically the 16 digit number on the card. In the case of accounts having multiple payment devices, (e.g., credit cards having PAN xxxx xxxx xxxx xxxx with husband and wife each having a respective card), each of the multiple cards is the same. However, authentication processing may be complicated by both a husband and wife (or any other multiplicity of persons) using multiple cards off one PAN. Illustratively, this is true in the situation where a counter is utilized to authenticate transactions associated with the card.

This also becomes a problem in the context of RFID (Radio Frequency IDentification) based cards like the Chase Blink Card, i.e., the Chase card with Blink. The Blink Card is one embodiment of the transponder 102 of FIG. 1. The Blink Card has a magnetic stripe for magnetic stripe processing, as well as an RFID chip for RFID based processing (where one just waves the card past an RFID capable reader). For those RFID based transactions, for example, the card reader (e.g. the receiver 106 of FIG. 1) reads (1) the PAN, (2) expiration date, and (3) discretionary data. All of (1)-(3) are read using the RFID reader off the RFID chip.

The discretionary data may include an ATC (Automatic Transaction Counter) which increments for each new transaction. When the cardholder runs a new RFID transaction, the ATC is read and then compared to an ATC value maintained by the card processor (e.g. JP Morgan Chase's authentication platform). If the derived values do not match, then the transaction is denied. This prevents fraud by a person who somehow reads (or otherwise acquires) the PAN and expiration data.

The problem is that in the multiple cards per PAN scenario, each card will have a different ATC count as those cards are used differently. For example, the husband may have an ATC value of 10 on the husband's card (as a result of making 10 transactions), and the wife has an ATC value of 25 on her card (as a result of making 25 transactions). Both cards are tied to the same PAN account. If the card processor has an ATC value of 25 (my wife's value) for our PAN, and I use my card which has an ATC of 10, obviously my transaction will not go through. The problem is how does the processor distinguish between the different cards for the PAN? In accordance with embodiments of the invention, the solution is to give each separate card its own device differentiator number (DDN), e.g., let's assume the account (PAN) has 4 purchase devices: (1) a first Blink card, (2) a second Blink card, (3) a first RFID key fob, and (4) a second RFID key fob. Each of the 4 devices is given its own DDN. Each then maintains its own ATC count, and the card processor also maintains an ATC count for each separate DDN. For example, each DDN may be stored on several bytes on the card and can be a value between 1-9, for example, to allow up to 9 different cards/fobs (or other devices) for the single PAN. It could be just 3 bits, which would allow up to 8 different values for 8 different cards/fobs or other devices. However, any suitable storage medium might be used (of any suitable size) to store the device differentiator number (DDN). For example, more than 9 values might be needed or desired, i.e., any number of values may be provided for, as desired. In general, any suitable number might be used to differentiate a particular payment device. For example, a numbering scheme might be used to uniquely identify the particular payment device, as well as to reflect that the particular payment device is a member of a family of payment devices. For example, the number of payment devices associated with a particular PAN might be reflected in the device differentiator number.

In one embodiment, the discretionary data (3) that is read off the card according to the invention includes (a) the DDN value, and (b) the ATC value. As a result, the authentication platform (based on the DDN) can identify which device was used to run the transaction. In particular, in the transaction server 200 of FIG. 6, the device identification portion 212 performs this identification. Accordingly, the authentication platform, and specifically the register portion 214 of FIG. 6, will know which ATC value that particular device is on (since the authentication platform retains the last counter it saw from that particular device, for example). In accordance with embodiments of the invention, the device differentiator number (DDN) (assigned to each separate payment device) might be characterized as a static portion, whereas the ATC is the dynamic portion. Once the transaction count value is known for the particular device, based on the device differentiator number, the authentication portion 216 performs authentication processing to determine if the requested transaction should be approved.

The solution to the ATC/multiple cards problem provided by the invention has various other significant benefits. One benefit is that the Digital Authentication Code (DAC) security mechanism can be used.

When the cardholder uses the card in its RFID mode, a DAC may be utilized and is computed by using a card-specific encryption key to compute a code result based on the ATC value read off the card, and a challenge value issued by the RFID card reader. (The computation of the DAC, which is similar to a hash or message authentication code, may also factor in the PAN and expiration date.) The DAC concept is described in U.S. Pat. No. 6,857,566 and U.S. Publication No. 2005/0121512 (continuation of the '566 patent), both assigned to MasterCard and incorporated herein by reference in their entirety. However, since the DAC works off the ATC value of a particular card or device, utilization of the DAC has been problematic in the multiple users/one PAN situation. However, with each card having its own device differentiator number (DDN) in accord with the invention, the authentication platform can discern between different cards or devices, for example. Accordingly, the authentication platform can determine the parameters upon which the DAC was computed, and in particular, the ATC that was used to compute the DAC. It is of course appreciated that DAC processing, or DAC related processing, is certainly not needed in practice of the invention. Rather, any of a variety of authentication processing might be used.

Other benefits of the invention flow from utilization of a respective DDN (assigned to each card/device), and the resulting ability to identify which device effected which transaction. A variety of these benefits may be provided in conjunction with using, or processing, the ATC. For example, through use of a DDN assigned to each separate payment device, the monitoring portion 220 of the transaction server 200 can track statistics on purchasing behavior of each separate cardholder (me versus my wife). In this manner, the device differentiator number (DDN) allows the monitoring portion 220 to granulate purchasing trends amongst various persons having the same PAN.

The DDN can further be used for Point of Sale (POS) loyalty purposes. Even though a husband and wife have the same PAN (i.e., plastic number), the monitoring portion 220 can tell that the wife consistently shops at TIFFANY&Co. (versus other comparables), but that the husband shops at a variety of comparable stores. This in turn may allow for more effective target marketing.

Utilization of the device differentiator number (DDN) can be used in fraud analysis by the monitoring portion 220. For example, if a husband and wife are respectively shopping in New York and LA, the card processor can distinguish between the two cards and legitimatize the transactions.

Utilization of the device differentiator number (DDN) can assist in channel specific authorization, i.e., by the authentication platform (the authentication portion 216) being able to tell which device ran the transaction. For example, a particular PAN might be associated with two payment devices, (1) a credit card with CVV and (2) a cell phone. The authentication portion 216 might be presented with an Internet transaction in which a CVV was presented to the on-line merchant. However, the authentication platform can ascertain whether the transaction was effected by the credit card or the cell phone. If by the cell phone, the authentication platform will know the transaction is fraudulent, i.e., since the cell phone has no CVV associated with it.

Further, a particular payment device may indeed have two device differentiator numbers (DDNs). For example, the Blink Card noted herein may have a DDN associated with the magnetic stripe and a DDN associated with RFID chip. As a result, the card processor (JP Morgan Chase) can tell which part of the Blink Card was used in which transaction. This allows various analysis helpful for marketing purposes, e.g., a determination that the RFID part of the Blink card is extensively used for some transactions.

Figure 5:
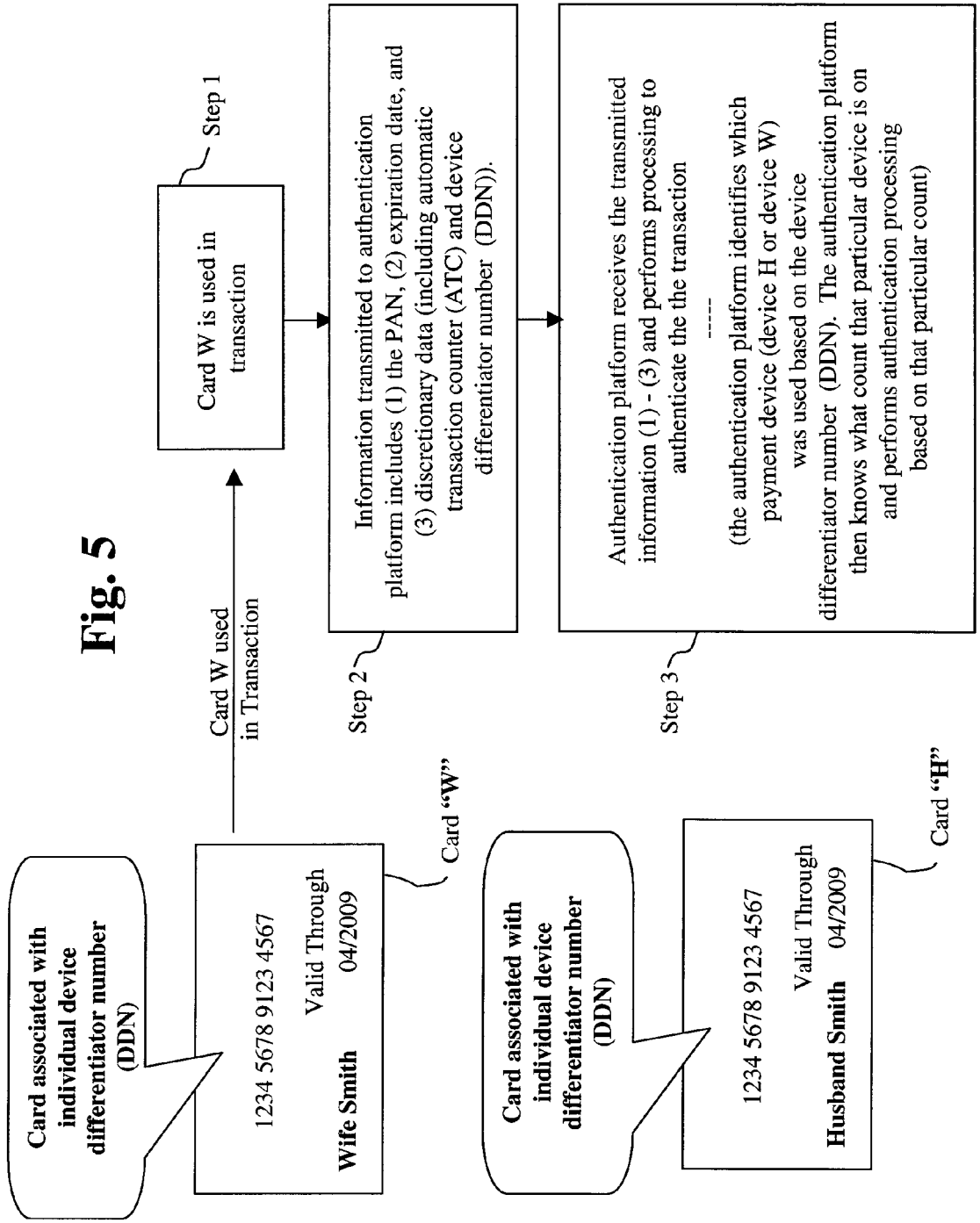
FIG. 5 is a diagram showing a validation process utilizing a respective device differentiator number (DDN), assigned to each card, in accordance with one embodiment of the invention.

FIG. 5 is a diagram showing a validation process utilizing a respective device differentiator number (DDN), assigned to each card, in accordance with one embodiment of the invention. As shown, both husband and wife (Husband Smith and Wife Smith) have their own physical card. Both cards have the same PAN. However, both cards have their own individual device differentiator number (DDN). The diagram illustrates the wife using her card in a transaction, as shown in step 1. After step 1, the process of FIG. 5 passes to step 2.

In step 2, information is transmitted to the authentication platform including (1) the PAN, (2) expiration date, and (3) discretionary data. The discretionary data includes an automatic transaction counter (ATC) and a device differentiator number (DDN).

After step 2, the process passes to step 3. In step 3, the authentication platform receives the transmitted information (1)-(3) and performs processing to authenticate the transaction. Specifically, the authentication platform first identifies which payment device (card H or card W) was used based on the device differentiator number (DDN), i.e., in this case, the authentication platform determines that card W was used. The authentication platform then determines what count (automatic transaction counter) that particular device is on and performs authentication processing based on that particular count. The process then ends with the authentication determination being transmitted back to the merchant, for example.

As described herein, a variety of processing and/or analysis can be performed using the device differentiator number (DDN), in addition to the authentication of the transaction. As an alternative to ATC (Automatic Transaction Counter), other authentication techniques may of course be used, e.g. such as time based authentication. However, the device differentiator number (DDN) described herein may well be used in the situation where the device differentiator number (DDN) is not needed for authentication, i.e., for the various other benefits as described herein.

As described in various embodiments herein, a device differentiator number is used to identify a particular payment device in the field. In such embodiments, further features may be implemented that apply particular rules to the authorization processing associated with a payment device.

In accordance with one embodiment of the invention, different rules may be applied to different devices associated with a particular PAN. Use of a particular payment device associated with a PAN may thus be controlled vis-a-vis another payment device associated with the same PAN. For example, the rules may limit which device may be used at which merchant or which type of merchant. Thus, a primary user of a first payment device associated with a PAN may have unlimited use of the PAN. However, the rules associated with a second payment device (provided to an assistant of the primary user) might only allow the assistant to shop at office supply stores, for example. This processing controlling which payment device may be used at which merchants may work off of existing merchant category codes (MCCs), for example, i.e., to determine at which store a customer is shopping. The rules associated with various payment devices (which are associated with the same PAN) may be varied as desired. Rules may hold for all the payment devices associated with a particular PAN, or alternatively, particular rules may apply to only some of the payment devices associated with a particular PAN.

In accordance with one embodiment of the invention, the rules associated with respective payment devices may differentially control the time of day that the particular payment device is usable. Further, the rules may control the amount of funds that are drawn using a particular payment device. For example, an assistant of the main cardholder is only allowed to spend $500 per day.

As described herein, the rules associated with a particular device may provide channel control. That is, a particular device may only be usable via a particular channel or channels. Accordingly, a transaction is denied if a request for the transaction comes through on a channel on which the particular device cannot operate. For example, if a Blink enabled device submits a request via an Internet channel, the rules might dictate for the transaction processing system to decline that transaction (the assumption being that the transaction is fraudulent). The rules controlling the channel control may be varied as desired.

Related to the channel control, in accordance with one embodiment of the invention, an alert system may be used in conjunction with excessive denials associated with the channel control. That is, the transaction processing system may watch for a high rate of denials on a particular channel. Such a high rate of failure may be indicative that indeed such requested transactions are not fraudulent. For example, a new technology might have come on-line which allows a particular payment device to operate on a channel that was previously not possible. The authentication system might then be adjusted to legitimize such transactions.

In accordance with embodiments of the invention, trend tracking is provided to track use of a particular payment device. For example, a user might always have used a payment device on a particular channel. Accordingly, the transaction processing system may be provided to identify a change in the normal channel used by a payment device. Any of a wide variety of other trend tracking capabilities may be utilized based on the capability to distinguish between different payment devices.

Further, an alert system may be used that tracks a particular payment device for particular criteria. The particular criteria to trigger the alert, as well as the manner in which the alert is reported out, may be varied as desired. For example, if a child spends more than $50 in a day (using the child's payment device), the parent might be alerted via a cell phone call. Alternatively, the parent might be suitably alerted if the child shops at a particular type of merchant, e.g. a liquor store.

Figure 7:
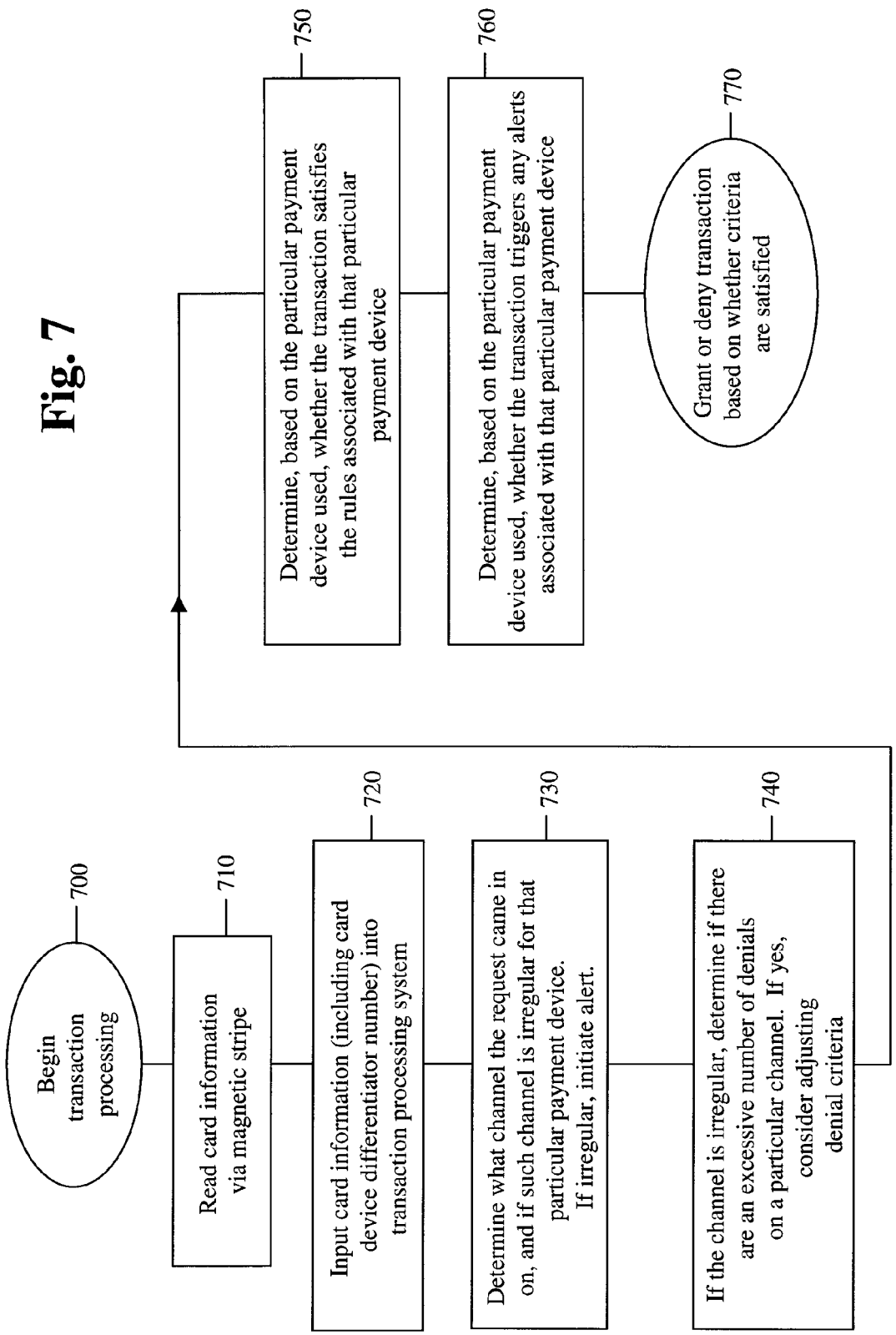
FIG. 7 is a flow chart showing further aspects of transaction processing in accordance with one embodiment of the invention.

FIG. 7 is a flow chart showing further aspects of transaction processing in accordance with one embodiment of the invention. In particular, FIG. 7 shows aspects of channel monitoring in accordance with one embodiment of the invention. As shown, the process starts in step 700 and passes to step 710. In step 710, in this example, the card information is read via a magnetic stripe. In step 720 the card information (including the DDN) is input into the transaction processing system.

In step 730 the particular channel that the request came in on is determined. Further, the process determines if such channel is irregular for that particular payment device. If it is indeed an irregular channel, an alert is initiated. The alert might be in the form of a call to the customer home number. For example, if the transaction request was for an Internet purchase (and the submitted DDN is associated with a device that cannot do Internet transactions), then an alert would be initiated.

After step 730, the process passes to step 740. In step 740, if the channel is irregular, the process determines if there are an excessive number of denials on a particular channel. If yes, the process considers adjusting the denial criteria. That is, it might be the case that new technology has come to market that provides use of a device on a new channel, i.e., a channel which was not previously usable by the particular device. By monitoring excessive denials on a particular channel and/or for a particular device type, the use of such new technology by a customer might be identified, and the system adjusted appropriately.

After step 740 of FIG. 7, the process passes to step 750. In step 750, the process determines, based on the particular payment device used (as identified by the DDN), whether the transaction satisfies any rules associated with that particular payment device. Then, in step 760, the process determines, based on the particular payment device used, whether the transaction triggers any alerts associated with that particular payment device. For example, the DDN might be associated with the daughter's credit card, and once a dollar amount is attained, an alert is sent to the parent's. In step 770, the process grants or denies the transaction based on whether criteria are satisfied, i.e., is the request authorized Hereinafter, further aspects of embodiments will be described. As described herein, discretionary data may include an ATC (Automatic Transaction Counter) which increments for each new transaction. It is appreciated that the ATC of a particular payment device may be inadvertently incremented so as to be out of synchrony with the transaction processing system (and the authentication performed thereby). For example, a payment device may be inadvertently read or energized so as to inadvertently increment the ATC of such payment device. Accordingly, the transaction processing system may be provided with a processing capability to accommodate such inadvertent incrementation of the ATC. For example, if an ATC value for a transaction is not valid, the transaction processing system might look ahead, i.e., increment, several values to determine if such ATC values might result in validation of the transaction.

In summary of aspects of the invention, and in explanation of yet further features, FIG. 8 is diagram showing use of multiple device differentiator numbers with one PAN in accordance with one embodiment of the invention.

As illustrated in FIG. 8, one PAN 802 is associated with a plurality of devices (810-818), i.e., any of the devices (810-818) may be used by the customer (or the customer's family) to access funds in the PAN account. This association is accomplished using a respective device differentiator number for each device (810-818). In requesting a transaction, the device differentiator number (associated with the particular device used) is sent to the authenticating entity along with the ATC (Automatic Transaction Counter) for the particular device. Typically, the PAN is also forwarded with a transaction request. As described in detail above, based on the PAN and the DDN submitted, the authenticating entity determines whether the ATC (also submitted) is valid. Accordingly, in accordance with one embodiment of the invention, any of a wide variety of devices may be used so long as such devices may provide the ATC, the DDN and the PAN values (or information by which the ATC, the DDN and the PAN are derivable). However, as described herein, devices that do not use an ATC may also be utilized, i.e., so as to realize the various benefits associated with use of a DDN, without an ATC.

For example, as described above, typically, the PAN is also forwarded with a transaction request. However, this may not always be the case. For example, the PAN might be somehow suitably derived from other information contained in the request. For example, a single PAN might be associated with a particular phone number, and thus derivable by the authenticating entity based on the phone number as described, for example, in U.S. Pat. 7,103,576 (U.S. patent application Ser. No. 09/956,997). Accordingly, the features described in U.S. Pat. No. 7,103,576 may be used in conjunction with the features described herein.

FIG. 8 shows illustrative devices which might be used in the practice of the invention. For example, the DDN 000I1 is associated with the internet browser 810 of the customer's computer. That is, when the customer (or a member of the customer's family) submits a transaction using the browser 810, the ATC, the DDN and the PAN is submitted in some suitable manner, such as by the user typing in such information and/or through use of a cookie on the customer's computer, for example. Alternatively, the customer might use a password protected applet 811 on the same physical computer to submit a transaction request associated with the DDN 002I. Each of these are considered a "device" having an associated device differentiator number (DDN), i.e., so the authenticating entity can determine which device was used. In turn, the authenticating entity can separately track (and separately report in a statement to the customer) transaction activity associated with the two devices 810, 811).

FIG. 8 also shows that the wife's credit card 812 is associated with the DDN 003; the husband's credit card 813 is associated with the DDN 004; the son's credit card 814 is associated with the DDN 005; and the son's key fob 815 is associated with the DDN 006. Thus, the authenticating entity can distinguish between purchases made by these respective devices.

Further, FIG. 8 shows that transactions may be submitted using the wife's cell phone, via devices 816 and 817. For example, the DDN 007 may be verbally conveyed by the wife in a telephone call, the PAN identified from the incoming cell phone number, and the ATC conveyed by the output of a suitable tone. The physical phone might also contain an RFID device, which is associated with a separate DDN (008).

Lastly, the DDN 009 is shown as associated with a dog's RFID device. Such device might be used when the dog is placed in a kennel, for example. The user could drop off and pick up the dog without ever dealing with any sign-in sheet or other administrative matter. Rather, the dog's presence would be tracked via interface with the RFID device 818.

It is appreciated that a wide variety of devices may be used. Each device may be associated with its own DDN. For example, an RFID device (with DDN) might be provided to interact with a gasoline filling station, such as an automobile, boat or personal watercraft filling station.

FIG. 8 also illustrates, as described above, that particular rules might be associated with particular DDNs, i.e., particular devices associated with the particular DDNs. For example, as shown, a rule set might be applied to the DDNs 005 and 006 to limit spending activity of a son.

FIG. 8 also shows that the form of the DDN may vary as desired. For example, the DDN 001I denotes, for example, that such DDN is associated with a device that is expected to effect Internet transactions. The dog's RFID device 818, on the other hand, is not expected to effect Internet transactions. Thus, an Internet transaction submitted using the PAN 802 with the DDN 009 would be flagged as potentially fraudulent.

In accordance with one embodiment of the invention, a customer may be provided with the ability to vary the rules associated with some or all of the DDNs associated with their PAN. In one embodiment, the user might vary the rules based on rule level. For example, all the devices (DDNs) of the customer personally might be considered to be at a first level. On the other hand, all the devices of the customer's son might be considered to be at a second level. Accordingly, the customer might collectively vary the rules at either the first or second level. For example, at the second level, the customer might collectively change all the son's devices (as identified by the authenticating entity using the DDNs) to have a maximum per day limit of $100 versus $50.

In accordance with one embodiment of the invention, the ability to uniquely identify a particular payment device (based on information submitted in the transaction request) allows the ability to segregate purchases associated with a particular PAN based on which payment device effected the particular purchase. That is, in a typical situation, several payment devices will be associated with a single PAN. The primary account holder (or a representative thereof) will typically receive a monthly statement of all the transactions associated with the particular PAN. The invention allows segregation of the transactions (in a statement) based on which payment device effected the transaction. This segregation may be performed in a variety of ways as desired. For example, all the transactions associated with all the primary account holders payment devices may be set out in one listing, while the transactions effected by the children's payment devices may be set out in a separate listing. The particular arrangement may be varied as desired. For example, if electronically viewed (such as over the Internet) various view options may be provided as desired. The various views may segregate the transactions (based on which payment device effected the transaction) in any manner desired. The user would then be provided suitable options to select which view the user wishes to review.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A system that keeps check of financial transactions by maintaining a count of the financial transactions using a register portion, in conjunction with performing authentication for at least one transaction, the system comprising:
   a payment device including a data-bearing record, the data-bearing record storing a transaction count value and a device differentiator number associated with the payment device, wherein the payment device is a RFID device;
   a receiver that receives the transaction count value and the device differentiator number;
   a transaction server comprising:
      a computer memory that stores stored data; and
      a computer readable medium including program code effective to perform the following:
         in a device identification portion, identifying the payment device based on the device differentiator number and an account number associated with the payment device;
         in a register portion, maintaining a count of financial transactions so as to provide a current transaction count value associated with the device differentiator number for the account number, the register portion maintaining current transaction count values for respective device differentiator numbers, which device differentiator numbers are associated with the account number; and
         in an authentication portion, performing authentication processing based on a comparison process that utilizes the current transaction count value and the transaction count value, the authentication portion generating an authentication result, the authentication portion outputting the authentication result.

2. The system of claim 1, in which the payment device is a transponder.

3. The system of claim 1, in which the authentication portion outputs the authentication result to a point of sale device.

4. The system of claim 1, in which the account number and the device differentiator number are used by the processing portion to track and document activity associated with the account number and the device differentiator number, the processing portion also separately tracking and documenting activity of other device differentiator numbers associated with the same account number.

5. A system that keeps check of financial transactions by maintaining a count of the financial transactions using a register portion, in conjunction with performing authentication for at least one transaction, the system comprising:
   a payment device including a data-bearing record, the data-bearing record storing a transaction count value and a device differentiator number associated with the payment device;
   a receiver that receives the transaction count value and the device differentiator number;
   a transaction server comprising:
      a computer memory that stores stored data; and
      a computer readable medium including program code effective to perform the following:
         in a device identification portion, identifying the payment device based on the device differentiator number and an account number associated with the payment device;
         in a register portion, maintaining a count of financial transactions so as to provide a current transaction count value associated with the device differentiator number for the account number, the register portion maintaining current transaction count values for respective device differentiator numbers, which device differentiator numbers are associated with the account number; and
         in an authentication portion, performing authentication processing based on a comparison process that utilizes the current transaction count value and the transaction count value, the authentication portion generating an authentication result, the authentication portion outputting the authentication result;
   wherein the stored data, in the processing portion, includes a first device differentiator number and a second device differentiator number that are both respectively associated with respective transaction effecting components in the payment device, the payment device being a single physical device.

6. A system that keeps check of financial transactions by maintaining a count of the financial transactions using a register portion, in conjunction with performing authentication for at least one transaction, the system comprising:
   a payment device including a data-bearing record, the data-bearing record storing a transaction count value and a device differentiator number associated with the payment device;
   a receiver that receives the transaction count value and the device differentiator number;
   a transaction server comprising:
      a computer memory that stores stored data; and
      a computer readable medium including program code effective to perform the following:
         in a device identification portion, identifying the payment device based on the device differentiator number and an account number associated with the payment device;
         in a register portion, maintaining a count of financial transactions so as to provide a current transaction count value associated with the device differentiator number for the account number, the register portion maintaining current transaction count values for respective device differentiator numbers, which device differentiator numbers are associated with the account number; and in an authentication portion, performing authentication processing based on a comparison process that utilizes the current transaction count value and the transaction count value, the authentication portion generating an authentication result, the authentication portion outputting the authentication result;

wherein the stored data includes a first device differentiator number and a second device differentiator number that are both associated with the account number.

7. The system of claim 6, in which the stored data further includes a third device differentiator number, the second device differentiator number and the third device differentiator number both respectively associated with respective transaction effecting components in the payment device, the payment device being a single physical device.

8. The system of claim 6, in which the processing portion further includes an account monitoring portion, the account monitoring portion separately monitoring transaction activity associated with the first device differentiator number and the second device differentiator number, which are both associated with the account number.

9. The system of claim 8, in which the account monitoring portion separately keeps track of activity associated with the first device differentiator number and the second device differentiator number.

10. The system of claim 9, in which the stored data in the processing portion reflects that the first device differentiator number and the second device differentiator number are associated with two different physical payment devices.

11. The system of claim 9, in which the activity that the monitoring portion separately keeps track of is activity related to fraud monitoring.

12. The system of claim 10, wherein the activity that the monitoring portion separately keeps track of is repeat purchasing behavior.

13. The system of claim 10, in which the activity that the monitoring portion separately keeps track of is activity related to comparing purchasing behavior associated with the first device differentiator number vis-a-vis purchasing behavior associated with the second device differentiator number.

14. The system of claim 10, in which the stored data reflects that the different physical payment devices are associated with different users in the same family.

15. The system of claim 14, in which the two different physical payment devices are associated with different communication channels, the authentication portion inputting information from the receiver regarding which communication channel the transaction came in on, and the authentication portion validating that such communication channel is valid for the particular device differentiator number that the transaction is associated with.

16. The system of claim 6, in which the authentication processing includes utilizing Digital Authentication code (DAC) processing.

17. The system of claim 1, wherein the data bearing record further comprises the account number.

18. The system of claim 1, wherein the account number is derived using at least one of the transaction count value and the device differentiator number.

19. The system of claim 1, in which the receiver senses the data-bearing record so as to input at least one of the transaction count value and the device differentiator number.

20. The system of claim 19, wherein the receiver is a RFID device.

21. The system of claim 1, in which the receiver is a communication input at a financial institution.

22. The system of claim 1, in which the processing portion, based on the device differentiator number and the account number, retrieves a rule set, and the rule set having different rules for different device differentiator numbers associated with the account number.

23. The system of claim 22, the rules being directed to limiting a dollar amount of transactions.

24. The system of claim 22, the rules being directed to limiting the type of merchant at which the transaction is performed, the processing portion determining the type of merchant based on at least a merchant category code.

25. A method to keep check of financial transactions by maintaining a count of the financial transactions using a register portion, in conjunction with performing authentication for at least one transaction, the method comprising:

providing a payment device including a data-bearing record, the data-bearing record storing a transaction count value and a device differentiator number associated with the device, wherein the payment device is a RFID device;

a receiver receiving the transaction count value and the device differentiator number from the payment device;

at least one computer processor identifying the payment device based on the device differentiator number and an account number associated with the device;

the at least one computer processor maintaining a count, by a register portion, of financial transactions so as to provide a current transaction count value associated with the device differentiator number for the account number, the register portion maintaining current transaction count values for respective device differentiator numbers, which device differentiator numbers are associated with the account number;

the at least one computer processor performing authentication processing based on a comparison process that utilizes the current transaction count value and the transaction count value; and the at least one computer processor generating and outputting an authentication result, based on the authentication processing.

26. A system that keeps check of financial transactions by maintaining a count of the financial transactions using a register portion, in conjunction with performing authentication for at least one transaction, the system comprising:

a payment device including a data-bearing record, the data-bearing record storing a transaction count value and a device differentiator number associated with the payment device, wherein the payment device is a RFID device;

a receiver that receives the transaction count value and the device differentiator number;

a transaction server comprising:

a computer memory that stores stored data; and a computer readable medium including program code effective to perform the following:

in a device identification portion, identifying the device based on the device differentiator number and an account number associated with the payment device;

in a register portion, maintaining a count of financial transactions so as to provide a current transaction count value associated with the device differentiator number for the account number, the register portion maintaining current transaction count values for respective device differentiator numbers, which device differentiator numbers are associated with the account number; and in an authentication portion, performing authentication processing based on a comparison process that utilizes the current transaction count value and the transaction count value, the authentication portion generating an authentication result, the authentication portion outputting the authentication result;

wherein the account number and the device differentiator number are used by the processing portion to track and document activity associated with the account number and the device differentiator number, the processing portion also separately tracking and documenting activity of other device differentiator numbers associated with the same account number;

wherein the processing portion, based on the device differentiator number and the account number, retrieves and applies a rule set to the transactions, and the rule set having different rules for different device differentiator numbers associated with the account number; and wherein the rules are directed to limiting a dollar amount of transactions; and wherein the rules are directed to limiting the type of merchant at which the transaction is performed for the payment device, the processing portion determining the type of merchant based on at least a merchant category code.

27. The system of claim 1, wherein the payment device is one of a credit card, a smart card, a RFID card, a key FOB, a phone, a personal music device.

* * * * *